(12) United States Patent
O'Neill et al.

(10) Patent No.: US 6,611,642 B1
(45) Date of Patent: Aug. 26, 2003

(54) OPTICAL COUPLING ARRANGEMENT

(75) Inventors: James Arthur O'Neill, Ottawa; Chenjun Fan, Nepean; Steven Harold Moffat, Carleton Place; Ray Robert LaPierre, Nepean, all of (CA)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/505,868

(22) Filed: Feb. 17, 2000

(51) Int. Cl.⁷ .............. G02B 6/32; G02B 6/30; G02B 6/293; H04J 14/02
(52) U.S. Cl. .............. 385/33; 385/24; 385/49; 385/52; 359/131; 359/723
(58) Field of Search ............ 385/24, 33, 49–52; 359/131, 722, 723

(56) References Cited

U.S. PATENT DOCUMENTS

| | | | | |
|---|---|---|---|---|
| 5,039,193 A | * | 8/1991 | Snow et al. | 385/25 |
| 6,078,710 A | * | 6/2000 | Li et al. | 385/39 |
| 6,125,221 A | * | 9/2000 | Bergmann et al. | 385/33 |
| 6,215,221 B1 | | 9/2000 | Bergmann et al. | 385/33 |

\* cited by examiner

*Primary Examiner*—Hemang Sanghavi
*Assistant Examiner*—Omar Rojas, Jr.
(74) *Attorney, Agent, or Firm*—Neil Teitelbaum

(57) ABSTRACT

An optical coupler and method of making an optical filter is disclosed wherein a compound lens having two separate movable lenses are disposed between input/output ports and a filter element, such as a dichroic filter element. The filter is tuned during assembly by varying the gap between the movable lenses. Once it is established that optimum coupling is achieved and a desired wavelength response is achieved, the two lenses are fixed in place.

13 Claims, 3 Drawing Sheets

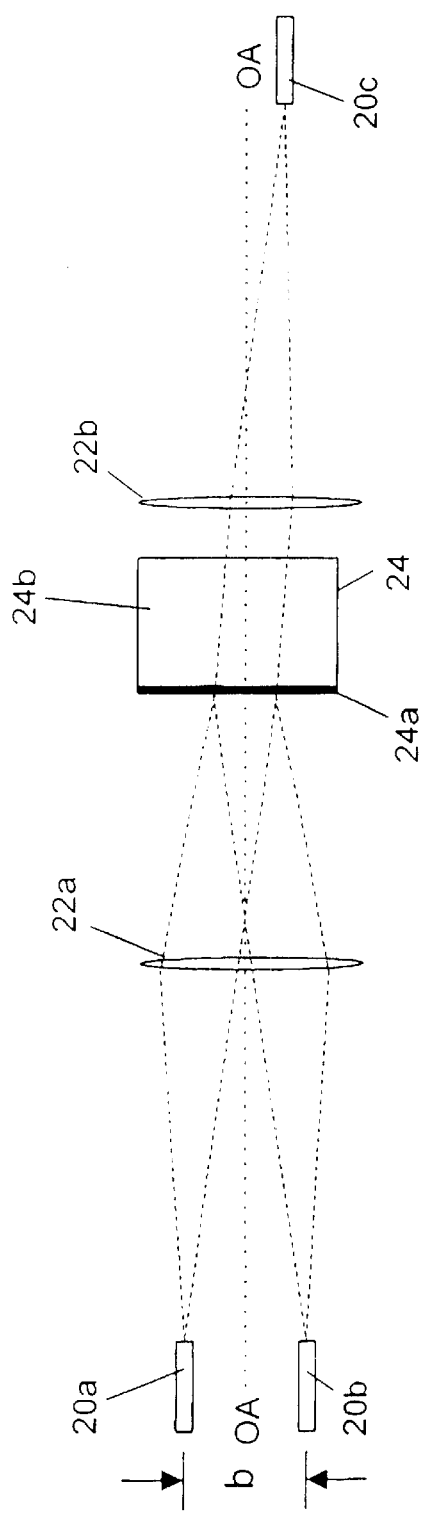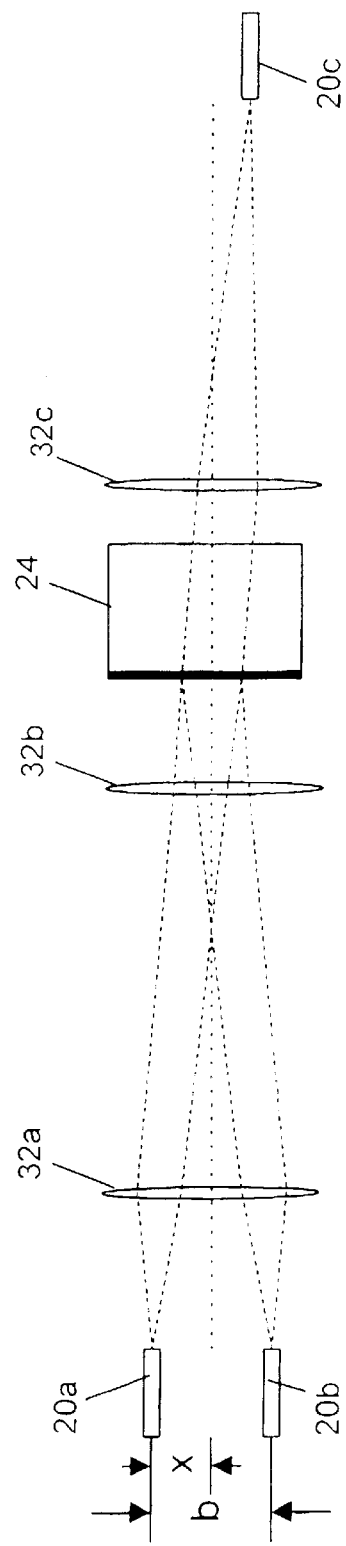

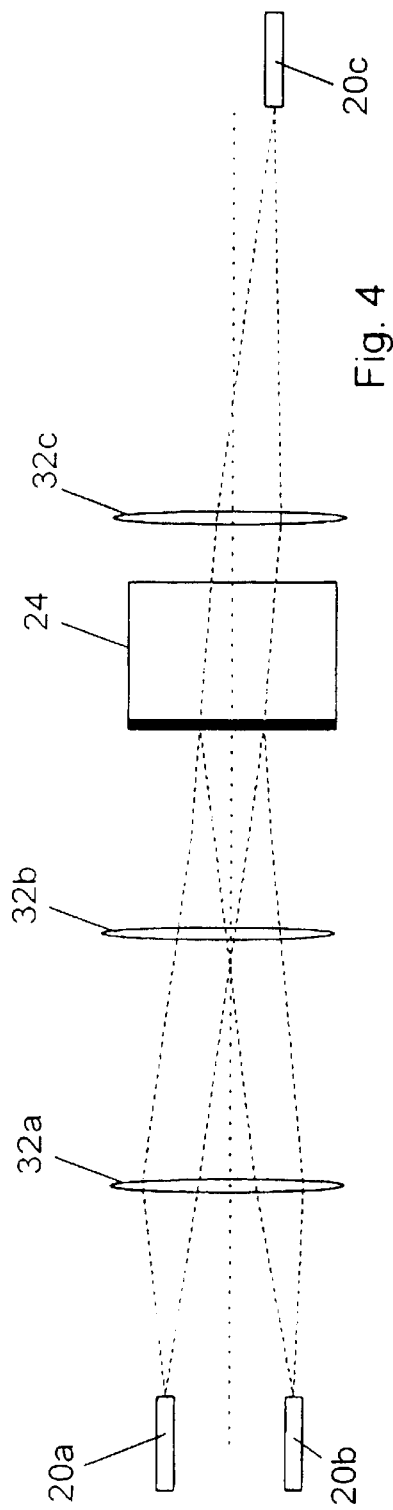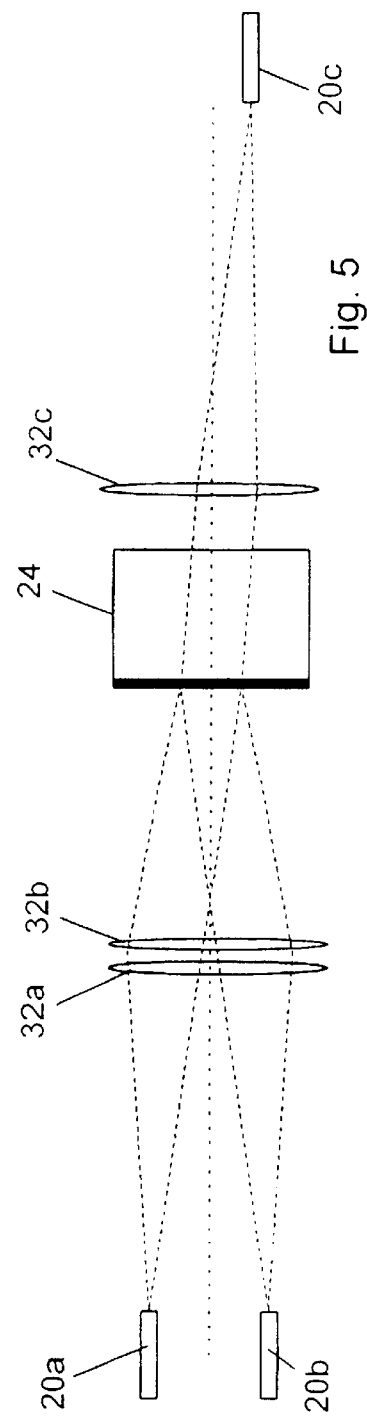

OPTICAL COUPLING ARRANGEMENT

FIELD OF THE INVENTION

This invention relates generally to the assembly of an optical element that has a response which varies with angle of incidence of light upon it, such as a dichroic filter element; the invention more particularly relates to a method of constructing and tuning a WDM filter during manufacture thereof and to a WDM itself.

BACKGROUND OF THE INVENTION

Precisely aligning an optical fibre with an optical component such as a multilayer thin film optical interference filter, for example, a dichroic filter, which has a wavelength response that is dependent upon the angle of incident light, is generally a time consuming activity requiring a high degree of precision from an operator. One method of achieving a required alignment between an optical fibre end and a filter element, which has been used as of late, is to provide a plurality of different optical fibre ferrules or sleeves sometimes referred to as a fibre tubes, each having two spaced bores therein tightly accommodating two optical fibres. These sleeves are used for testing the response of an optical filter; and, each sleeve has a different spacing "b" between the pair of optical fibre ends contained therein. Hence, several sleeves having a pair of fibres with ends varying in lateral distance by an incremental amount are used for the testing procedure. Consequently, the smallest difference between different sleeves provides the smallest step or increment in which tunability is afforded. In order to test the dichroic optical filter element prior to its assembly into a coupler, different tubes are selected and used for testing. Broadband light is launched from one of the optical fibres in one of the tubes toward the angle sensitive optical filter; a detector at the output end detects the wavelength of light transmitted through the filter element, thereby identifying the tube from which the light originated. Different tubes are used to vary the input angle; as angle of incidence is varied, the wavelength of detected light varies, and hence so does the output response of the filter. When a wavelength of light measured at the output corresponds to a desired wavelength, the dimensions of the tube are noted and a tube of corresponding dimensions is used, or ordered from a supplier so that the filter may be assembled. Unfortunately, this method requires stocking a variety of sizes of optical fibre tubes, or alternatively, waiting for delivery of a supply of tubes having openings of desired separations. Notwithstanding, when a tube of a desired dimension is received its dimensions will sometimes vary from the expected dimension, due to manufacturing tolerances of the tubes, unduly affecting the response of the filter. Tuning resolution is also limited by the fact that tube bore separations vary discretely. In contrast, and advantageously this invention provides a means for providing continuous tuning.

It is desired to obviate the costly and time consuming process of manufacturing optical filters, by providing a means of tuning the filter during the testing process and fixing the components in place once a desired response is achieved.

It is an object of this invention, to provide such a method and filter which obviate the requirement of using such a large number of different sleeves in the manufacturing process.

It is a further object of the invention to provide an optical fibre sleeve that is used in testing of the filter, wherein the same sleeve is used in the manufacture of the filter, thereby obviating the requirement of providing a "facsimile" sleeve to the test sleeve.

It is a further object of the invention to provide a tunable filter assembly that can be tuned during testing and affixed in place after the assembly elements are relatively tuned to achieve a desired response.

It is yet a further object of the invention to provide a coupler that can be continuously tuned, obviating the limitation of prior art methods of discrete tuning increments.

SUMMARY OF THE INVENTION

In accordance with the invention, there is provided, an optical filter comprising:

a first optical waveguide;

an optical filter element disposed to receive light from the first optical waveguide;

a first lens and a second lens disposed between the first optical waveguide and the optical filter, such that a beam of light exiting the first optical waveguide destined for the optical filter traverses the first lens and the second lens and is substantially collimated at the optical filter; and, a second optical waveguide for receiving at least a portion of the beam of light after it impinges upon the optical filter element.

In accordance with another aspect of the invention a method of manufacturing an optic coupler is provided having two optical fibres at an end disposed within an optical fibre tube housing ends of the two optical fibres in a fixed relative relationship having a fixed lateral distance between the ends comprising the steps of:

a) providing an optical filter element and disposing the optical fibre ends to receive or provide light to the optical filter element;

b) providing a compound lens including at least two spaced lenses and disposing the compound lens between the optical fibre ends and the optical filter element; and, c) varying a gap between the two spaced lenses to provide a desired wavelength response for light propagating from one of the ends of the two optical fibres through the filter.

BRIEF DESCRIPTION OF THE DRAWINGS

FIG. 2 is a schematic diagram showing a side view of a WDM filter having two spaced optical fibres at one end shown out of the sleeve for ease of understanding, a filter element, two lenses and a receiving/transmitting optical fibre at another end;

FIG. 3 is a schematic diagram showing a side view of a WDM filter in accordance with an embodiment of the invention;

FIGS. 4 and 5 are schematic diagrams showing a side view of the WDM filter of FIG. 3, wherein a compound lens arrangement is adjusted differently; and, FIG. 6 is graph of Gaussian Coupling Loss versus Lens Separation illustrating insertion loss arising from a mismatch of MFD at the exit optical fibre;

DETAILED DESCRIPTION

Figure 1:
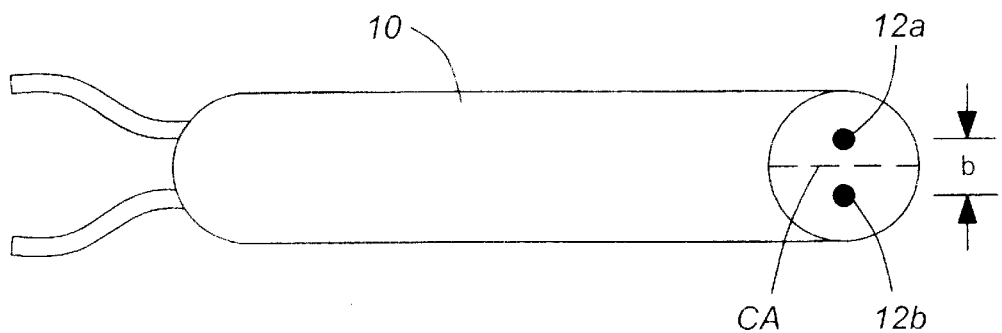
FIG. 1 is an axonometric view optical fibre sleeve having bores for two optical fibres contained therein.

Referring now to FIG. 1, an optical fibre tube 10 is shown having two fibre ends 2a and 12b disposed therein and polished so that the end face of the tube and fibre ends form a planar surface. Sleeves or ferrules of this type are typically made of glass or a ceramic material and are manufactured to very tight tolerances of within a few μm. The two fibre ends 12a and 12b are disposed a same distance "b/2" from the central longitudinal axis CA of the fibre tube 10. Sleeves are manufactured with openings that are spaced with different distances from the central axis and wherein the offset from the central axis is the same for both openings. For ease of understanding, the two optical fibres shown in FIG. 2 are shown absent the fibre sleeve 10 in which they are housed. The center of the optical fibre cores of fibres 20a and 20b are spaced a distance "b" apart. A multilayer thin film dichroic optical filter 24 consisting of a transparent substrate 24b supporting a multi-layer thin film coating 24a is disposed between two lenses 22a and 22b in such a manner as to intercept a beam of light launched from one of the fibre ends 12a or 12b. The focal length and position of the lens 22a ensures that light launched from optical fibre end 20a will be substantially collimated as it impinges upon the filter 24. The lens 22b ensures that the beam transmitted through the filter 24 is focused at the fibre end 20c. The location of the lens 22a along the dotted line OA determines whether or not the beam passing therethrough will be collimated about the filter coating 24a. For a given separation between the fibre 20a and filter 24a, there is a unique position of the lens 22a along OA such that the light impinging on the filter 24a is substantially collimated.

Turning now to FIGS. 3 through 5, three similar optical filter assemblies are shown, wherein a compound lens comprising two lenses 32a and 32b are disposed between the optical fibre 20a and the filter 24. As in the prior art circuit a single lens 32c is disposed between the filter and the single fibre 20c.

FIGS. 3, 4, and 5 illustrate that as the lenses 32a and 32b are brought closer together, the angle of incidence of the beam of light impinging upon the filter increases becoming steeper; alternatively, as the lenses are separated and the distance "d" between them increases, the angle of incidence upon the filter lessens. In this manner, the filter can be tuned during manufacture to ensure a desired wavelength response of the filter. Furthermore, this affords using a standard fibre tube to contain the two optical fibres 20a and 20b or selecting one of a few standard tubes and subsequently tuning the filter by relatively moving the lenses 32a and 32b to vary the gap therebetween; in this manner a large tuning range is afforded.

The effective focal length $f_{eff}$ of the compound lens combination 32a, 32b is:

$$f_{eff} = \frac{f_1 f_2}{f_1 + f_2 - d},$$

where $f_1$ is the focal length of the first lens 32a, $f_2$ is the focal length of the second lens 32b and d is the distance between opposing principal planes of lenses 32a and 32b, and if the lenses are "thin" d is the distance between the two lenses, 32a and 32b, By varying the separation between the two elements of the compound lens the effective focal length can be varied between a maximum value and a minimum value, i.e. $f_{min} < f_{eff} < f_{max}$. The focal length of the single lens 32c which focuses transmitted light into the output fibre is preferably selected to be in the middle of the range for $f_{eff}$.

Figure 6:
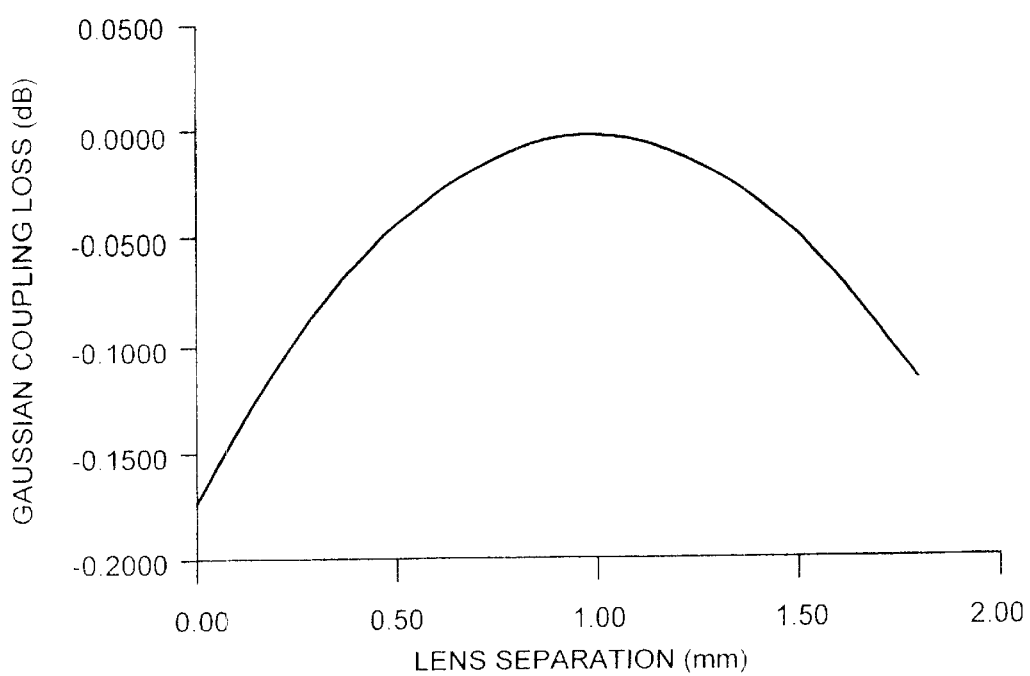

Various factors affect whether the coupling of light is optimum, or alternatively if coupling loss results. When some of the light transmitted through the filter element 24 is not coupled into its destination output fibre, coupling loss results. The graph of FIG. 6 illustrates coupling as a function of lens separation between lenses 32a and 32b over a tuning range of interest; this Gaussian coupling loss arises from a mismatch between the mode field diameter, MFD, of the output fibre and the focussed spot size at the entrance to the output fibre 20c. As shown in FIG. 6 there is an optimum focussed spot size that couples with the least loss into the fibre 20c. This minimum loss point occurs when the separation between lenses 32a and 32b is such that their effective focal length, $f_{eff}$, is equal to the focal length of the single lens 32c. If $f_{eff}$ differs from the focal length of lens 32c, the spot size is too large or too small, and some loss is incurred.

In one embodiment of the invention (not shown) a compound lens is disposed on both sides of the filter 24. In this manner, the effective focal lengths are adjusted to be identical. Due to the additional cost and complexity of this embodiment, the more practical and cost effective embodiment is shown in FIGS. 3, 4, and 5, wherein a single lens 32c is provided to focus the light into the fibre 20c. The device shown in FIGS. 3, 4, and 5 is divided into two sides by the filter. One side, referred to as the input side, has the input and reflection ports. The transmission side has the transmission port only. Thus, FIGS. 3, 4 and 5 describe a three port device. Alternatively an additional port maybe proviced on the transmission side to yield a four port device. Yet another embodiment (also not shown) is a two port device similar to FIGS. 3, 4 and 5 except that the lens 32c and transmission fibre 20c are absent. The preferred embodiment consists of a compound lens on the input side and a singlet lens on the transmission side.

In the manufacture of an optical filter, the spacing of the elements of the compound lens 32a and 32b are adjusted while measuring the wavelength of light that is transmitted through the filter 24. Changing the spacing of the lenses changes the angle of incidence on the filter and, hence the wavelength of the transmitted light. When the desired wavelength is reached the lens spacing is fixed.

Subsequently, the reflected signal is optimized. This requires simultaneous adjustment of the distance between the input fibre 20a and first lens 32a, referred to as the front working distance, FWD and the distance between the filter and the second element 32b of the compound lens, referred to as the back working distance, BWD by adjusting the positions of the input fibre 20a and the compound lens, whose component lenses 32a and 32b are relatively fixed, while monitoring the reflected signal. When the optimum respective positions are reached, the lens pair and the fibre tube are fixed in place.

Finally, the transmission fibre tube accommodating the optical fibre 20c is positioned for optimum coupling while monitoring the transmitted test signal.

Of course numerous other embodiments may be envisaged without departing from the spirit and scope of the invention.

What is claimed is:

1. An optical filter comprising:
   a first optical waveguide;
   an optical filter element disposed to receive light from the first optical waveguide;
   a first lens and a second lens disposed between the first optical waveguide and the optical filter, such that a beam of light exiting the first optical waveguide destined for the optical filter traverses the first lens and the second lens and is substantially collimated at the optical filter; and, a second optical waveguide for receiving at least a portion of the beam of light after it impinges upon the optical filter, wherein said first lens and said second lens have respective focal lengths $f_1$ and $f_2$ and are spaced a distance d apart, the distance being less than the sum of the focal lengths $f_1$ and $f_2$.

2. An optical filter as defined in claim 1, wherein the first and second lenses are absent an optical element therebetween.

3. An optical filter as defined in claim 2, wherein an only medium in the gap between the two lenses is a fluid.

4. An optical filter as defined in claim 1, wherein the first optical waveguide and the second optical waveguide have ends disposed with a fixed separation.

5. An optical filter as defined in claim 4, wherein the first and second optical waveguides are optical fibres each disposed within a different opening within a sleeve.

6. An optical filter as defined in claim 5, further comprising a third optical fibre optically coupled with one of the first and second optical fibres for receiving at least a portion of focused filtered light from one of said first and second optical fibres.

7. An optical filter as defined in claim 6 further comprising a third lens disposed between the filter element and the third optical fibre for substantially focusing and coupling light into the third optical fibre.

8. An optical filter as defined in claim 5, wherein the first and second lenses are disposed such that light launched from one of the first and second fibres propagating through the first and second lenses is subsequently substantially collimated as it impinges upon the filter element, and disposed so as to provide an angle of incidence that corresponds to a desired filtering wavelength.

9. An optical filter as defined in claim 7, wherein the three lenses are positioned at locations and having respective focal lengths to substantially focus at least a portion of the launched light into the third waveguide after traversing the filter element.

10. A method of manufacturing an optical filter having an optical filter tube housing ends of two optical fibres in a fixed relative relationship, the method comprising the steps of:

a) optically coupling the optical fibre ends with an optical filter element;

b) providing a compound lens including at least two spaced lenses, the spaced lenses having each a focal length, and disposing the compound lens between the optical fibre ends and the optical filter element;

c) varying a gap between the two spaced lenses until a desired wavelength response is achieved for light propagating from one of the ends of the two optical fibres through the filter, the gap being smaller than the sum of the focal lengths of the spaced lenses.

11. A method of manufacturing an optical filter as defined in claim 10 further comprising the steps of:

repositioning the compound lens, while monitoring an optical signal reflected to the second optical fibre.

12. A method of manufacturing an optical filter as defined in claim 10 further comprising the step of fixing the compound lens and the optical fibre tube when an optimum position is reached.

13. A method of manufacturing an optical filter as defined in claim 10 further comprising the step of positioning a transmission optical fibre tube containing an optical fibre for optimum coupling with the fixed lenses and fixing the fibre tube while monitoring the test light signal.

\* \* \* \* \*

UNITED STATES PATENT AND TRADEMARK OFFICE
CERTIFICATE OF CORRECTION

PATENT NO. : 6,611,642 B1 Page 1 of 1
DATED : August 26, 2004
INVENTOR(S) : O'Neill et al.

It is certified that error appears in the above-identified patent and that said Letters Patent is hereby corrected as shown below:

Column 2,
Line 67, "ends 2a and 12b" should read -- ends 12a and 12b --.

Column 3,
Line 35, insert the following:
-- As seen in Figs. 3, 4 and 5, the two lenses 32a and 32b are absent an optical element therebetween and the only medium between them is a fluid, e.g. air. --

Signed and Sealed this

Twenty-ninth Day of June, 2004

JON W. DUDAS
*Acting Director of the United States Patent and Trademark Office*